United States Patent
Stouder-Studenmund et al.

(10) Patent No.: US 10,599,619 B2
(45) Date of Patent: Mar. 24, 2020

(54) TECHNIQUES FOR MANAGING FILE FRAGMENTATION AT A COMPUTING DEVICE

(71) Applicant: Apple Inc., Cupertino, CA (US)

(72) Inventors: William R. Stouder-Studenmund, San Diego, CA (US); Pavel Sokolov, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 211 days.

(21) Appl. No.: 15/721,416

(22) Filed: Sep. 29, 2017

(65) Prior Publication Data

US 2018/0349402 A1 Dec. 6, 2018

Related U.S. Application Data

(60) Provisional application No. 62/514,728, filed on Jun. 2, 2017.

(51) Int. Cl.
| | |
|---|---|
| *G06F 16/00* | (2019.01) |
| *G06F 16/17* | (2019.01) |
| *G06F 12/109* | (2016.01) |
| *G06F 12/1009* | (2016.01) |

(52) U.S. Cl.
CPC ........ *G06F 16/1724* (2019.01); *G06F 12/109* (2013.01); *G06F 12/1009* (2013.01); *G06F 16/1727* (2019.01); *G06F 2212/65* (2013.01)

(58) Field of Classification Search
CPC ............ G06F 16/1724; G06F 16/1727; G06F 12/1009; G06F 12/109; G06F 2212/65
USPC .......................................................... 707/693
See application file for complete search history.

(56) References Cited

U.S. PATENT DOCUMENTS

| | | | |
|---|---|---|---|
| 7,555,504 B2 * | 6/2009 | Bixby | G06F 16/128 |
| 7,664,771 B2 | 2/2010 | Kusters et al. | |
| 8,032,498 B1 * | 10/2011 | Armangau | G06F 16/128 |
| | | | 707/690 |
| 8,620,973 B1 | 12/2013 | Veeraswamy et al. | |
| 9,424,137 B1 * | 8/2016 | Mam | G06F 11/1451 |
| 2008/0270719 A1 | 10/2008 | Cochran et al. | |
| 2014/0040714 A1 * | 2/2014 | Siegel | G06F 17/212 |
| | | | 715/203 |

\* cited by examiner

*Primary Examiner* — Monica M Pyo
(74) *Attorney, Agent, or Firm* — Dickinson Wright RLLP

(57) ABSTRACT

The described embodiments set forth techniques for managing the fragmentation of files at a computing device. Specifically, the techniques involve, for a given file, analyzing different extents of the file under a "segment window" basis to identify whether a fragmentation threshold is satisfied between the extents that correspond to the scope of the segment window. In turn, for each segment window that satisfies the threshold level of fragmentation, (1) the data for the extents is copied into an allocated area of contiguous memory, and (2) the extents are updated to reference the copied data. Additionally, the original data referred to by the extents can be freed for usage within the computing device, thereby increasing storage space. In this manner, the overall fragmentation of the file is substantially reduced under the segment window basis, thereby improving the overall performance of the computing device.

20 Claims, 13 Drawing Sheets

FRAGMENTATION TABLE 111

| IDENTIFIER 118 | FRAGMENTATION SCORE 122 |
|---|---|
| FILE_D | 4 |
| FILE_C | 2 |
| FILE_B | 2 |
| FILE_A | 2 |
| ... | ... |
| ... | ... |

Table Entry 252

TECHNIQUES FOR MANAGING FILE FRAGMENTATION AT A COMPUTING DEVICE

CROSS-REFERENCE TO RELATED APPLICATIONS

The present application claims the benefit of U.S. Provisional Application No. 62/514,728, entitled "TECHNIQUES FOR MANAGING FILE FRAGMENTATION AT A COMPUTING DEVICE," filed Jun. 2, 2017, the content of which is incorporated herein by reference in its entirety for all purposes.

FIELD

The described embodiments set forth techniques for managing the fragmentation of files at a computing device. Specifically, the techniques involve analyzing different extents of a given file under a "segment window" basis to substantially increase the overall efficiency/effectiveness of the manner in which the file is subsequently defragmented.

BACKGROUND

Modern file systems can utilize a "copy-on-write" approach with respect to managing the creation and modification of files within a given file system volume. For example, the copy-on-write approach can enable an original file to be "cloned" (i.e., logically duplicated) and refer back to the same data of the original file so long as the original file and the cloned file remain unmodified. In turn, when either the original file or the cloned file is modified, the modified portion can be written into a new area of memory, and the modified file can be updated to refer (at least in part) to the new area of memory. In this manner, the overall storage space consumption rate by the file system volume can remain highly efficient, especially in scenarios where files are regularly cloned and marginally modified (e.g., edited photos/videos, modified databases, etc.).

Despite the various benefits that are afforded using the copy-on-write approach, file fragmentation—which is a side-effect of the copy-on-write approach, and substantially degrades performance—has yet to be addressed. In particular, and as mentioned above, the copy-on-write approach can involve establishing new portions of a file—often referred to as "extents"—each time the file is modified. Consequently, the file can become heavily fragmented as modifications are made to the file over time, where the different extents of the file are physically stored in a disjoined manner across the storage device. Notably, these disjoined extents can be problematic for a variety of storage devices, e.g., magnetic-based storage devices. In particular, it is both time and resource-intensive for these storage devices to relocate mechanical reading components to the disjoined extents when attempting to access the file. As a result, the overall latency associated with accessing the file—as well as the resources required to access the file—can scale with the fragmentation level of the file, thereby degrading both performance and the overall user experience.

Consequently, there exists a need for a more efficient approach for managing the fragmentation of files at a computing device.

SUMMARY

Representative embodiments set forth herein disclose various techniques for managing the fragmentation of files at a computing device.

According to some embodiments, a method is disclosed for analyzing the fragmentation of a file on a computing device. In particular, the method can involve a first step of (1) receiving a request to access a file, where the file is associated with (i) a scanned flag that indicates the file has not been scanned for fragmentation, and (ii) a fragmentation score. Next, the method can involve (2) accessing a plurality of extents associated with the file, where each extent of the plurality of extents corresponds to (i) a starting physical block address within a memory, and (ii) a length of successive physical blocks within the memory. Next, the method can involve (3) establishing (e.g., based on a size of the file) a plurality of segment windows under which to analyze the plurality of extents. Subsequently, the method can involve, for each segment window of the plurality of segment windows in which at least two extents of the plurality of extents are logically disposed: (i) identifying, among the at least two extents, a number of contiguity gaps that exist between the respective physical blocks of the at least two extents, and (ii) adding the number to the fragmentation score when the number satisfies a fragmentation threshold. Finally, the method can involve (4) updating the scanned flag to indicate that the file has been scanned for fragmentation.

Additionally, the method can involve defragmenting the above-discussed file when the file becomes a candidate for fragmentation (e.g., when the fragmentation score is greater than zero). For example, the method can further involve (1) identifying that the fragmentation score of the file indicates that the file should be defragmented, and (2) for each segment window having a number contiguity gaps that satisfies the fragmentation threshold: (i) copying, into a new group of contiguous physical blocks within the memory, data referenced by the extents that correspond to the contiguity gaps, and (ii) updating the extents to reference the data copied into the new group of contiguous physical blocks. Additionally, the method can involve (3) freeing the data previously referenced by the extents. In this manner, the overall fragmentation of the file is efficiently yet substantially reduced in accordance with the segment windows, thereby improving the overall performance of the computing device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2E illustrate conceptual diagrams of an example scenario in which the fragmentation of an example file is analyzed, according to some embodiments.

DETAILED DESCRIPTION

Figure 1:
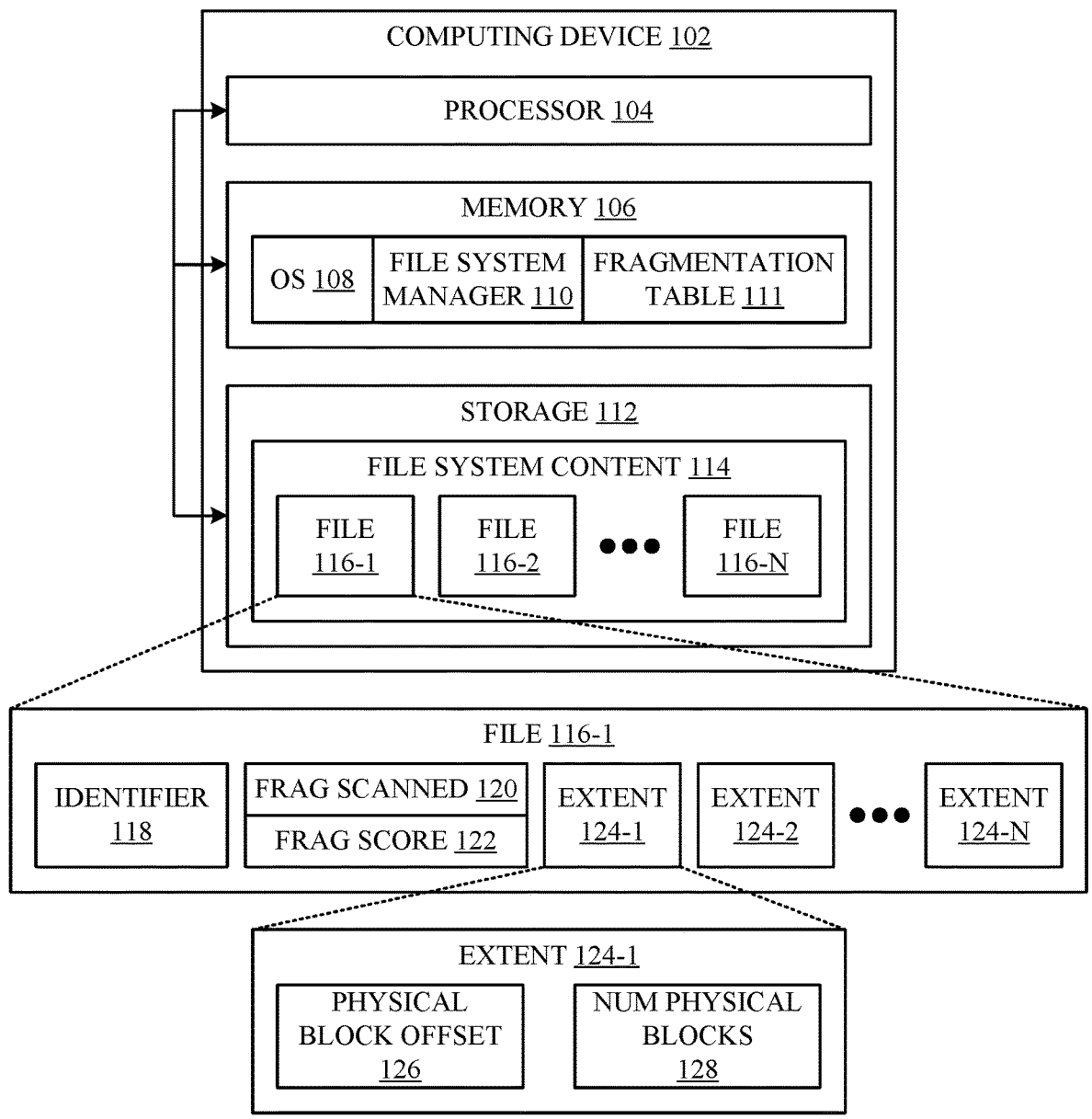
FIG. 1 illustrates a system diagram of a computing device that can be configured to perform the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The techniques described herein involve managing the fragmentation of files at a computing device. In particular, the techniques can be utilized to curb the overall fragmentation of files that naturally occurs over time as the files are created and modified within the computing device.

According to some embodiments, a first technique can involve analyzing files on the computing device to identify files that are fragmented and should undergo a defragmentation procedure. For example, a file system manager executing on the computing device can be configured to analyze a particular file in conjunction with receiving a request to access (e.g., read, write, memory map, etc.) the file. In turn, the file system manager can begin the fragmentation analysis by accessing a plurality of extents associated with the file, where each extent of the plurality of extents corresponds to (i) a starting physical block address within a memory (e.g., a hard drive) of the computing device, and (ii) a length of successive (i.e., contiguous) physical blocks within the memory. In particular, the file system manager can analyze the extents under a "segment window" basis such that the overall fragmentation of the file is considered in portions (as opposed to the file as a whole). More specifically, the file system manager can (1) identify segment windows that correspond to at least two of the extents, and (2) identify whether the corresponding data for the extents are contiguously stored in underlying/corresponding physical data blocks. According to some embodiments, the file system manager can identify a number of contiguity gaps between the underlying/corresponding physical blocks of the extents. In turn, the file system manager can add the number of contiguity gaps to a running total number of contiguity gaps associated with the file-referred to herein as a "fragmentation score." Additionally, the file system manager can be configured to update a "fragmentation scanned" flag associated with the file to indicate the completion of the fragmentation analysis. In this manner, if the file is accessed at a later time—but before a defragmentation procedure occurs (as described below in greater detail)—the file system manager can read the flag and avoid redundantly performing the same fragmentation analysis.

As noted above, the file system manager can also be configured to defragment files when appropriate. For example, the file system manager can identify a file for defragmentation based on its fragmentation scanned flag/fragmentation score. In any case, when the file system manager identifies the file for defragmentation, the file can re-scan the file for any updates to the fragmentation that might have occurred since the last fragmentation analysis was performed. In turn, the file system manager can defragment the file on a segment window basis. Specifically, the file system manager can identify the segment windows whose underlying extents satisfy a fragmentation threshold (e.g., three contiguity gaps), and defragment each of the segment windows on an individual basis. For example, for a given segment window, the file system manager can allocate a new group of contiguous physical blocks within the memory (e.g., based on a size of the extents that correspond to the scope of the segment window). In turn, the file system manager can copy original data of the extents into the new group of contiguous physical blocks, and update the extents to refer to the copied data. Additionally, the file system manager can "free" (i.e., deallocate) the original data back into the memory, thereby completing the defragmentation procedure for the file. In this manner, the overall fragmentation of the file is substantially reduced in accordance with the segment windows, thereby improving the overall performance of the computing device.

A more detailed discussion of these techniques is set forth below and described in conjunction with FIGS. 1-6, which illustrate detailed diagrams of systems and methods that can be used to implement these techniques.

FIG. 1 illustrates a block diagram 100 of different components of a computing device 102 that can be configured to implement the various techniques described herein, according to some embodiments. More specifically, FIG. 1 illustrates a high-level overview of the computing device 102, which, as shown, can include at least one processor 104, at least one memory 106, and at least one storage 112. According to some embodiments, the processor 104 can be configured to work in conjunction with the memory 106 and the storage 112 to enable the computing device 102 to implement the various techniques set forth in this disclosure. According to some embodiments, the storage 112 can represent a storage device that is accessible to the computing device 102, e.g., a hard disk drive, a solid-state drive, and hybrid device (e.g., including both hard disk and solid-state drives), and the like.

As shown in FIG. 1, the storage 112 can be configured to store file system content 114 of a file system volume that can be mounted at the computing device 102. For example, the processor 104 can be configured to mount a file system volume that includes an OS 108 that is compatible with the computing device 102. According to some embodiments, the OS 108 can enable a file system manager 110 to execute on the computing device 102, where the file system manager 110 can be involved in the fragmentation analysis/defragmentation procedures described herein. As is well-understood, the OS 108 can also enable a variety of processes to execute on the computing device 102, e.g., OS daemons, native OS applications, user applications, and the like. According to some embodiments, the file system volume can also include user data that is accessible at the computing device 102 by way of the OS 108. However, it is noted that, in some configurations, such user data can instead be stored in a separate file system volume that can be concurrently mounted on the computing device 102 and accessible to the OS 108. According to some embodiments, the file system volumes can be members of a same (or different) logical container and can be configured to utilize the same physical storage space within the storage 112. This beneficially provides enhanced flexibility as each file system volume can consume space within the storage 112 on an as-needed basis. In addition, each file system volume can be configured to enforce particular configurations (e.g., permissions, ownerships, encryption schemes, fragmentation schemes, etc.) that are independent from the configurations of other file system volumes managed by the computing device 102.

As shown in FIG. 1, the file system content 114 can include a collection of files 116, and each file 116 can include an identifier 118 that can be used to uniquely identify the file 116 within the storage 112. Each file 116 can also include one or more extents 124 that describe the layout of the file within the storage 112. For example, each extent 124 can include (i) a starting physical block address (within the storage 112)—illustrated in FIG. 1 as the physical block offset 126, and (ii) a length of successive physical blocks (that follow the starting physical block address)—illustrated in FIG. 1 as the number of physical blocks 128. In this manner, a single file 116 can be separated into various extents 124 that are stored across different areas of the storage 112. Additionally, each file 116 can include (1) a fragmentation scanned flag 120, and (2) a fragmentation score 122. According to some embodiments, the fragmentation scanned flag 120 can indicate whether the file 116 was scanned for fragmentation. Additionally, the fragmentation score 122 can indicate an overall fragmentation of the file 116.

Additionally, the file system manager 110 can be configured to manage a fragmentation table 111 that stores information about files 116 that have (1) been scanned for fragmentation, and (2) satisfy a fragmentation threshold (and therefore should be defragmented). For example, when the file system manager 110 scans a file 116 for fragmentation—and identifies that the fragmentation within the file 116 satisfies the fragmentation threshold—the file system manager 110 can create an entry within the fragmentation table 111 for the file 116 to indicate that a defragmentation should be performed on the file 116. As described below in greater detail, the different entries for the files 116 within the fragmentation table 111 can be ordered according to their fragmentation scores 122. According to some embodiments, the file system manager 110 can be configured cause the defragmentation procedures to be performed at the computing device 102 at appropriate times. For example, the file system manager 110 can interface with one or more background processes that identify appropriate times at which defragmentation procedures should be performed, e.g., based on usage levels, power availability, thermal load, and so on. Additionally, the file system manager 110 can cause the defragmentation procedures to be performed in a reactive manner, e.g., when a threshold number of entries are added to the fragmentation table 111, when a threshold amount of time has passed since a previous defragmentation procedure was executed, and so on.

Accordingly, FIG. 1 sets forth an overview of different components/entities that can be included in the computing device 102 to enable the embodiments described herein to be properly implemented. A more detailed description of the various functionalities of these components/entities will now be provided below in conjunction with FIGS. 2-6.

Figure 2A:
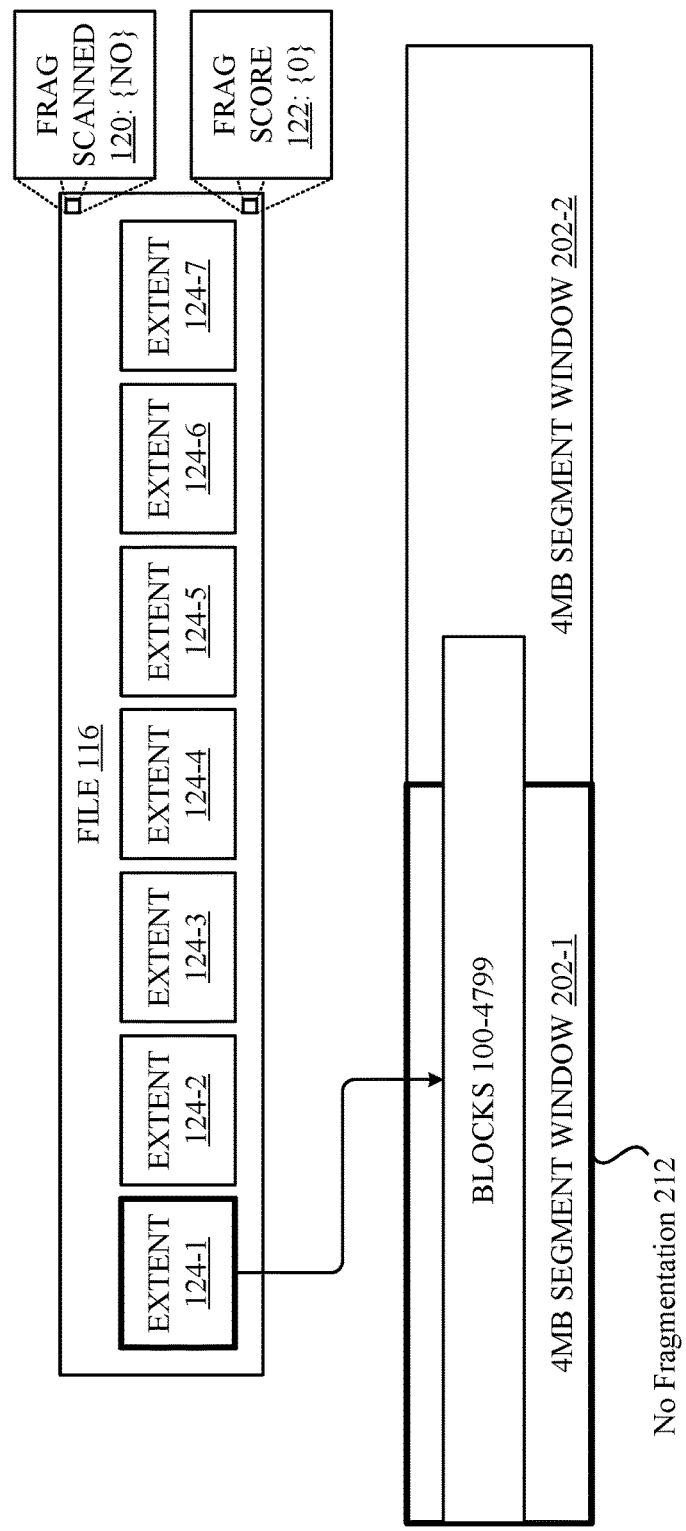

FIGS. 2A-2E illustrate conceptual diagrams of an example scenario in which the file system manager 110 analyzes the fragmentation of an example file 116, according to some embodiments. As shown in FIG. 2A, a first step 210 can involve the file system manager 110 initializing a fragmentation analysis of the file 116 in response to identifying that the file (1) is about to be accessed, and (2) has a fragmentation scanned flag 120 that indicates the file 116 has not been scanned for fragmentation. For example, the file system manager 110 can be configured to initialize the fragmentation analysis in response to identifying that a read operation, a write operation, or a memory map operation is being performed in association with the file 116. Additionally, it is noted that when the fragmentation scanned flag 120 indicates that the file has not been scanned for fragmentation, this does not necessarily mean that the file 116 has never been scanned for fragmentation. On the contrary, the fragmentation scanned flag 120 merely indicates whether a fragmentation analysis should occur at the time the file 116 is being accessed. For example, when space is allocated to/deallocated from a file 116 that is marked as scanned, it can be appropriate to scan the file 116 the next time it is accessed in order to identify any fragmentation that might have been caused by the space allocation/deallocation. In this regard, the file system manager 110 can be configured to reset the fragmentation scanned flag 120 whenever space is allocated to/deallocated from the file 116, which will cause the fragmentation analysis to be carried out the next time the file 116 is accessed. Alternatively, the file system manager can be configured to perform an updated fragmentation analysis in conjunction with (e.g., after) allocating space to/from the file 116, and leave the fragmentation scanned flag 120 intact.

In any case, in the example as shown in FIG. 2A, the file 116—having a unique identifier 118 assigned as "FILE_D"—includes seven extents 124 that are to be analyzed under the fragmentation analysis. According to some embodiments, and as previously described herein, the fragmentation analysis can involve the utilization of segment windows to logically separate the file 116 into smaller portions while performing the fragmentation analysis. According to some embodiments, each segment window can be a fixed size that is based on, for example, a size of the physical blocks included in the storage 112, an average size of the files 116 managed by the computing device 102, and so on. For example, as shown in FIG. 2A, the file system manager 110 can utilize segment windows 202 that are sized to four megabytes (4 MB), where the physical blocks included in the storage 112 are sized to one kilobyte (1 KB). It is noted that the sizes of the segment windows 202/physical blocks described herein are merely exemplary, and that the techniques can be applied to any sizing scheme that is most appropriate for the computing device 102. For example, the segment window sizes can be individually configured for each file system volume managed by the computing device 102 to account for the different types of content managed by the file system volumes. In another example, different segment window 202 sizes can be applied within the same file system volume, e.g., one or more additional flags can be applied to each file 116 to indicate the manner in which segment windows 202 should be applied to the file 116. Moreover, the physical blocks can be sized in accordance with any configuration, e.g., 1 KB blocks, 2 KB blocks, 4 KB blocks, and so on.

In any case, as shown in FIG. 2A, the file system manager 110 can begin the fragmentation analysis by identifying the extents 124 that correspond to the scope of a segment window 202-1. For example, in FIG. 2A, the file system manager 110 can determine—based on the physical block offset 126/number of physical blocks 128—that the extent 124-1 corresponds to the scope of the segment window 202-1. For example, the file system manager 110 can base a start of the segment window 202-1 on the physical block offset 126 of the extent 124-1, and identify whether the underlying physical blocks of the extent 124-1—i.e., identified by the number of physical blocks 128—(1) exceed the end of the segment window 202-1 (i.e., cross into one or more next segment windows 202), or (2) are contained within the segment window 202-1. As shown in FIG. 2A, the extent 124-1 corresponds to forty-eight hundred (4800) physical blocks—each sized at 1 KB—thereby exceeding the size of the segment window 202-1—sized at 4 MB—by eight hundred blocks. In this regard, no fragmentation exists within the scope of the segment window 202-1, as all of the underlying data (that corresponds to the scope of the segment window 202-1) is stored in contiguous physical blocks within the storage 112. Accordingly, the file system manager 110 can disregard the fragmentation score 122—currently set at a value of zero—as no fragmentation exists within the segment window 202-1. At the conclusion of step 210, the file system manager 110 can analyze a next segment window 202-2 for fragmentation, which is described below in greater detail in conjunction with FIG. 2B.

Figure 2B:
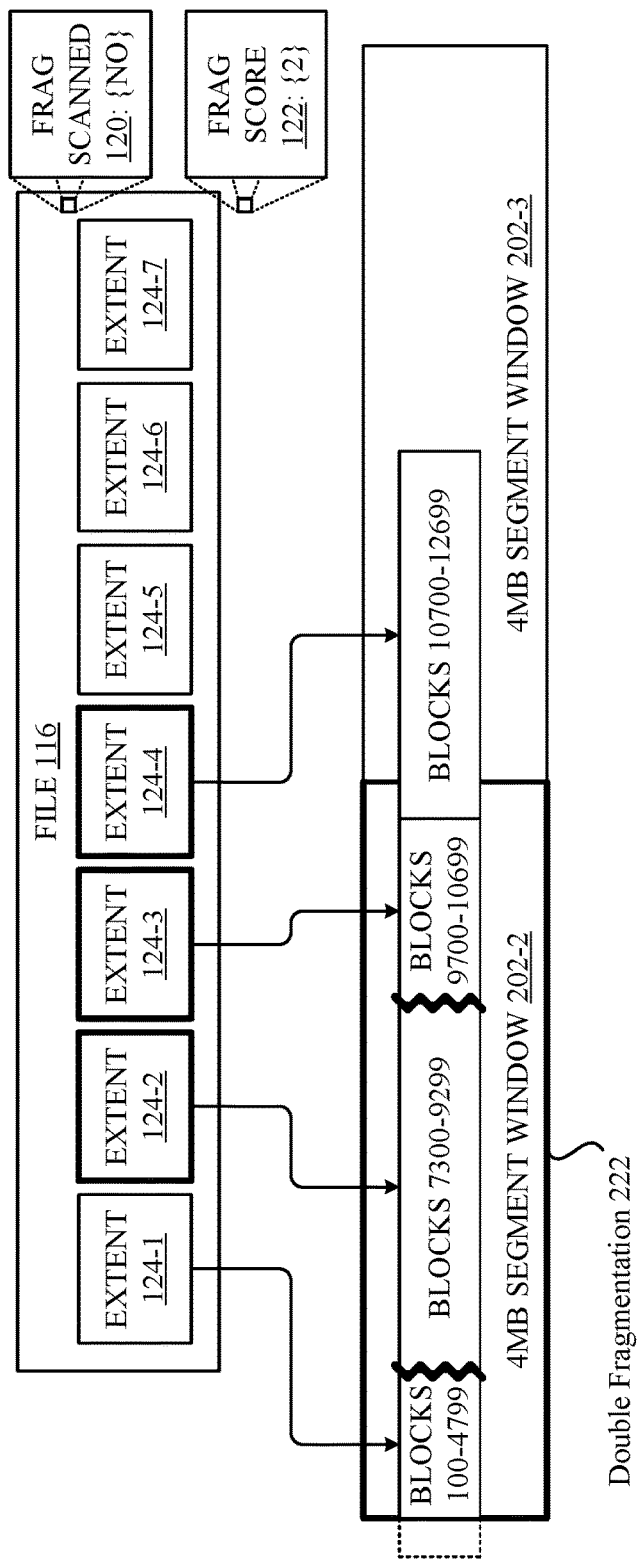

Next, as shown in FIG. 2B, the file system manager 110 can identify the extents 124 that correspond to the scope of a segment window 202-2. For example, in FIG. 2B, the file system manager 110 can determine—based on physical block offsets 126/the number of physical blocks 128—that the extents 124-2, 124-3, and 124-4 correspond to the scope of the segment window 202-2. In this example, the file system manager 110 can account for the overlapping physical blocks of the extent 124-1 (that bleed through the end of the segment window 202-1) when identifying the extents 124 that correspond to the scope of the segment window 202-2. In this regard, a starting point for the segment window 202-2 can correspond to the first physical block of the extent 124-1 that exceeds the end of the segment window 202-1. It is noted that other approaches can be used to dictate the manner in which extents 124 fall within the scope of a given segment window 202. For example, in FIG. 2A, the file system manager 110 can disregard the overlapping physical blocks of the extent 124-1, such that a starting point for the segment window 202-2 corresponds to the physical block offset 126 (i.e., the starting physical block) of the extent 124-2.

In any case, as shown in FIG. 2B, the file system manager 110 can identify that a first contiguity gap exists between the ending physical block of the extent 124-1 (4799) and the starting physical block of the extent 124-2 (7300), thereby representing fragmentation within the file 116. Additionally, the file system manager 110 can identify that a second contiguity gap exists between the ending physical block of the extent 124-2 (9299) and the starting physical block of the extent 124-3 (9700). On the contrary, the file system manager 110 can identify that contiguity occurs between the ending physical block of the extent 124-3 (10699) and the starting physical block of the extent 124-4 (10700). Accordingly, the file system manager 110 can update the fragmentation score 122 to reflect the two contiguity gaps identified within the scope of the segment window 202-2, which is denoted in FIG. 2B as the double fragmentation 222.

It is noted that the file system manager 110 can be configured to disregard the contiguity gaps within a given segment window 202 when they do not satisfy a fragmentation threshold. For example, the file system manager 110 can be configured to disregard a single contiguity gap, a double contiguity gap, a triple contiguity gap, and so on, so that overzealous defragmentation procedures are not carried out at the computing device 102. In the examples illustrated in FIG. 2B, the fragmentation threshold is set at a single contiguity gap, such that any segment windows 202 in which two or more contiguity gaps are identified contribute to the running total of contiguity gaps represented by the fragmentation score 122.

Additionally, it is noted that certain files 116 can be exempt from the fragmentation analyses described herein. For example, when all of the underlying data of a given file 116 is stored on a solid-state drive (e.g., non-volatile random-access memory (NVRAM), M.2 memory, 3DXPoint memory, etc.), the file system manager 110 can forego the fragmentation analysis on the file 116 as the seek times in solid-state drives are not significantly impacted by continuity gaps. It is noted that the file system manager 110 can maintain a list of storage device types that are exempt from the fragmentation procedures performed herein. For example, for a given extent 124, the file system manager 110 can identify reference the type of the underlying storage device against the list of storage devices to determine whether the extent 124 can be disregarded. The file system manager 110 can also be configured to exercise discretion at a fine-level of granularity, where the file system manager 110 disregards individual extents 124 when certain conditions are met. For example, some extents 124 can represent "holes" within a given file 116, where the extent 124 corresponds to an allocated number of physical blocks that belong to the file 116, but no actual data of the file 116 is stored within the physical blocks. When these holes are encountered, the file system manager 110 can treat the underlying physical blocks as a bridge between (1) the ending physical block of a previous extent (if any) to the hole-extent, and (2) the starting physical block of a next extent (if any) to the hole-extent. Additionally, various properties of a storage 112 that corresponds to a given extent 124 can be considered when performing a fragmentation analysis on the file 116. For example, when the storage 112 represents a hybrid drive, some extents 124 of a file 116 can be stored on a solid-state drive, and other extents 124 of the file 116 can be stored on a hard-disk (i.e., magnetic-based) drive. In this example, the file system manager 110 can be configured to disregard the extents 124 that are stored on the solid-state drive (because, as previously described above, seek times for solid-state drives are not as impacted by contiguity gaps).

Figure 2C:
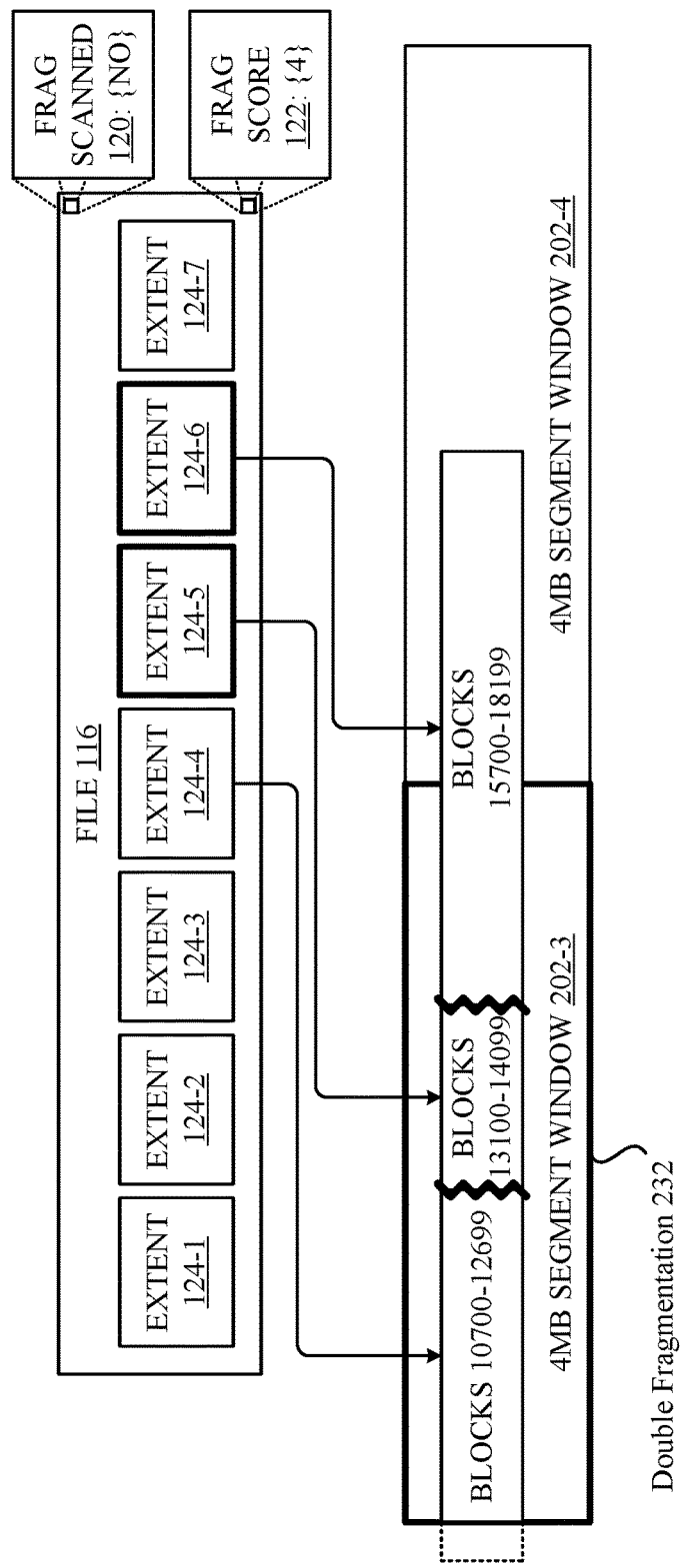

Returning back now to FIG. 2B, at the conclusion of step 220, the file system manager 110 can analyze a next segment window 202-3 for fragmentation, which will now be described in conjunction with FIG. 2C. As shown in FIG. 2C, the file system manager 110 can identify the extents 124 that correspond to the scope of the window 202-3. For example, in FIG. 2C, the file system manager 110 can determine—based on physical block offsets 126/the number of physical blocks 128—that the extents 124-5 and 124-6 correspond to the scope of the segment window 202-3. Again, the file system manager 110 can account for the overlapping physical blocks of the extent 124-4 (that bleed through the end of the segment window 202-2) when identifying the extents 124 that correspond to the scope of the segment window 202-3. In this regard, a starting point for the segment window 202-3 can correspond to the first physical block of the extent 124-4 that exceeds the end of the segment window 202-2. As shown in FIG. 2B, the file system manager 110 can identify that a first contiguity gap exists between the ending physical block of the extent 124-4 (12699) and the starting physical block of the extent 124-5 (13100), thereby representing fragmentation within the file 116. Additionally, the file system manager 110 can identify that a second contiguity gap exists between the ending physical block of the extent 124-5 (14099) and the starting physical block of the extent 124-6 (15700). Accordingly, the file system manager 110 can update the fragmentation score 122 to reflect the two contiguity gaps identified within the scope of the segment window 202-2, as illustrated by the double fragmentation 232 illustrated in FIG. 2C. At the conclusion of step 230, the file system manager 110 can analyze a next segment window 202-4 for fragmentation, which is described below in conjunction with FIG. 2D.

Figure 2D:
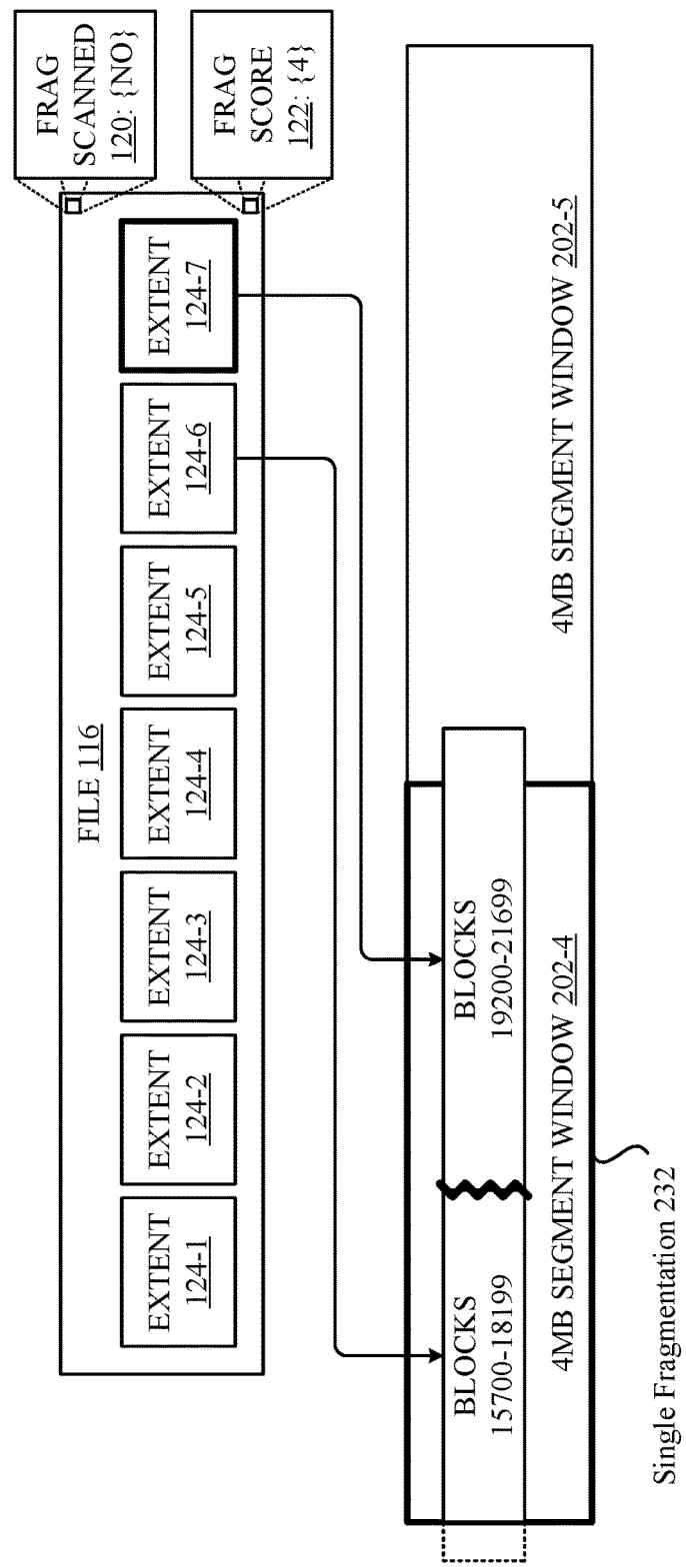

As shown in FIG. 2D, the file system manager 110 can identify the extents 124 that correspond to the scope of the next segment window 202-4. For example, in FIG. 2D, the file system manager 110 can determine—based on physical block offsets 126/the number of physical blocks 128—that the extent 124-7 corresponds to the scope of the segment window 202-4. Again, the file system manager 110 can account for the overlapping physical blocks of the extent 124-6 (that bleed through the end of the segment window 202-3) when identifying the extents 124 that correspond to the scope of the segment window 202-4. In this regard, a starting point for the segment window 202-4 can correspond to the first physical block of the extent 124-6 that exceeds the end of the segment window 202-3. As shown in FIG. 2D, the file system manager 110 can identify that a first contiguity gap exists between the ending physical block of the extent 124-6 (18199) and the starting physical block of the extent 124-7 (19200), thereby representing fragmentation within the file 116. Accordingly, as this is the only continuity gap within the scope of the segment window 202-4, the file system manager 110 can disregard this fragmentation based on the fragmentation threshold (which, in accordance with the example scenarios illustrated in FIGS. 2A-2E, requires two or more contiguity gaps to exist with a given segment window 202 for the fragmentation score 122 to be updated).

Additionally, the file system manager 110 can identify that the extent 124-7 is the final extent of the file 116, and disregard that fact that the physical blocks of the extent 124-7 bleed through the end of the segment window 202-4 (as no contiguity gaps will exist within the scope of the segment window 202-5). Accordingly, at the completion of step 240, the fragmentation analysis on the file 116 is completed, and the file system manager 110 can update the fragmentation table 111 to reflect the results of the fragmentation analysis. For example, as shown in FIG. 2E, a step 250 can involve the file system manager 110 adding an entry 252 into the fragmentation table 111 for the file 116 described in conjunction with FIGS. 2A-2D. According to some embodiments, the entry can include the identifier 118 of the file 116 and the fragmentation score 122. Additionally, it is noted that the fragmentation table 111 is not limited only to these entries. On the contrary, the fragmentation table 111 can include more detailed information about the file 116 to enable the techniques performed herein to be more efficiently implemented. For example, the fragmentation table 111 can be adapted to indicate the specific segment windows 202 of the file that contributed to the fragmentation score 122, as well as the individual fragmentation scores of each of the segment windows 202. In this manner, the file system manager 110 can, when carrying out a defragmentation procedure against the file 116, specifically target the extents 124 that correspond to the scopes of the segment windows 202, thereby increasing efficiency. Moreover, the file system manager 110 can prioritize the segment windows 202 in accordance with their overall contribution to the fragmentation score 122, such that the heavily fragmented segment windows 202 are prioritized for defragmentation by the file system manager 110 over less-fragmented segment windows 202.

Accordingly, FIGS. 2A-2E provide a detailed breakdown of an example scenario in which the file system manager 110 analyzes the file 116 for fragmentation. A high-level breakdown of these various techniques will now be discussed below in conjunction with FIG. 3, with reference to FIGS. 2A-2E.

Figure 3:
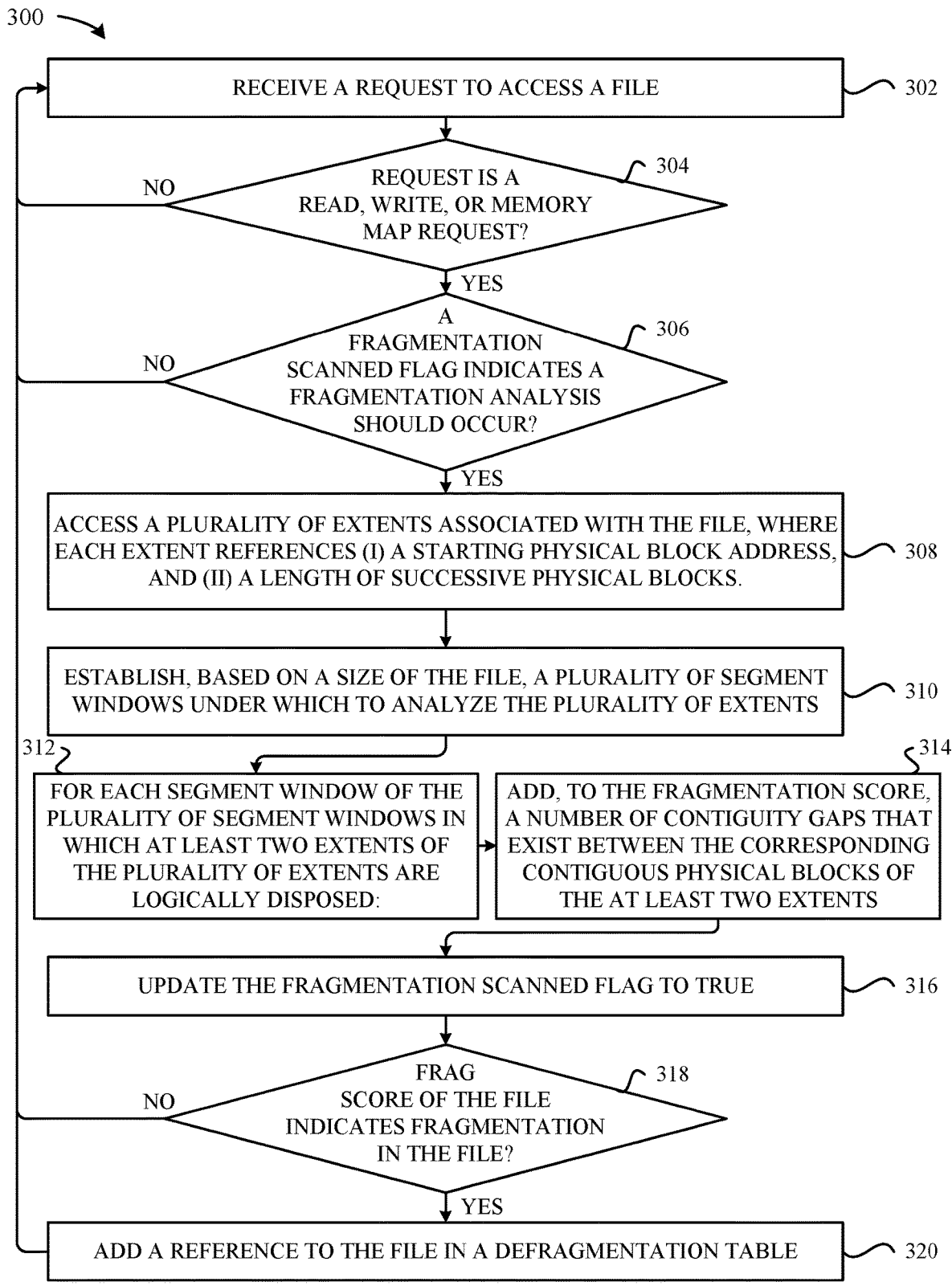
FIG. 3 illustrates a method for analyzing the fragmentation of a file, according to some embodiments.

FIG. 3 illustrates a method 300 for analyzing the fragmentation of a file 116, according to some embodiments. As shown in FIG. 3, the method 300 begins at step 302, where the file system manager 110 receives a request to access the file 116 (e.g., as described above in conjunction with FIG. 2A). At step 304, the file system manager 110 determines whether the request should provoke a fragmentation analysis of the file 116, e.g., based on whether the request is a read, write, or memory map request. If, at step 304, the file system manager 110 determines that the request is a read, write, or memory map request, then the method 300 proceeds to step 306. Otherwise, the method 300 proceeds to back to step 302, where the file system manager 110 can respond to additional requests to access files 116. At step 306, the file system manager 110 determines whether the fragmentation scanned flag 120 of the file 116 indicates that a fragmentation analysis should occur (e.g., the fragmentation scanned flag 120 is set to "false"). If, at step 306, the file system manager 110 determines that the fragmentation scanned flag 120 indicates that a fragmentation analysis should not occur, then the method 300 proceeds back to step 302, where the file system manager 110 can respond to additional requests to access files 116. Otherwise, the method 300 proceeds to step 308.

At step 308, the file system manager 110 accesses a plurality of extents 124 associated with the file 116, where each extent 124 references (i) a starting physical block address (e.g., the physical block offset 126 of the extent 124), and (ii) a length of successive physical blocks (e.g., the number of physical blocks 128 of the extent 124) (e.g., as described above in conjunction with FIGS. 2A-2D). At step 310, the file system manager 110 establishes, based on a size of the file 116, a plurality of segment windows 202 under which to analyze the plurality of extents 124 (e.g., as described above in conjunction with FIGS. 2A-2D). At step 312, the file system manager 110 carries out step 314 for each segment window 202 of the plurality of segment windows 202 in which at least two extents 124 of the plurality of extents 124 are logically disposed. In particular, at step 314, the file system manager 110 adds, to the fragmentation score 122, a number of contiguity gaps that are identified between the corresponding contiguous physical blocks of the at least two extents 124 (e.g., as described above in conjunction with FIGS. 2A-2D).

At step 316, the file system manager 110 updates the fragmentation scanned flag 120 to indicate that the file 116 has undergone a fragmentation analysis (e.g., the fragmentation scanned flag 120 is set to "true"). At step 318, the file system manager 110 determines whether the fragmentation score 122 of the file 116 indicates that fragmentation exists within the file 116 (e.g., the fragmentation score 122 is greater than zero). If, at step 318, the file system manager 110 determines that fragmentation score 122 of the file 116 indicates fragmentation exists within the file 116, then the method 300 proceeds to step 320. Otherwise, the method 300 proceeds back to step 302, where the file system manager 110 can respond to additional requests to access files 116. At step 320, the file system manager 110 adds a reference to the file 116 in the fragmentation table 111 (e.g., as described above in conjunction with FIG. 2E). Finally, the method 300 can return to step 302, where the file system manager 110 can respond to additional requests to access files 116.

Accordingly, FIGS. 2A-2E and 3 provide a detailed breakdown of techniques that can implemented to perform fragmentation analysis of files 116 within the computing device 102. As previously described above, these files 116—specifically, those included in the fragmentation table 111—can undergo a defragmentation procedure, the details of which are described below in conjunction with FIGS. 4A-4D and 5.

Figure 4A:
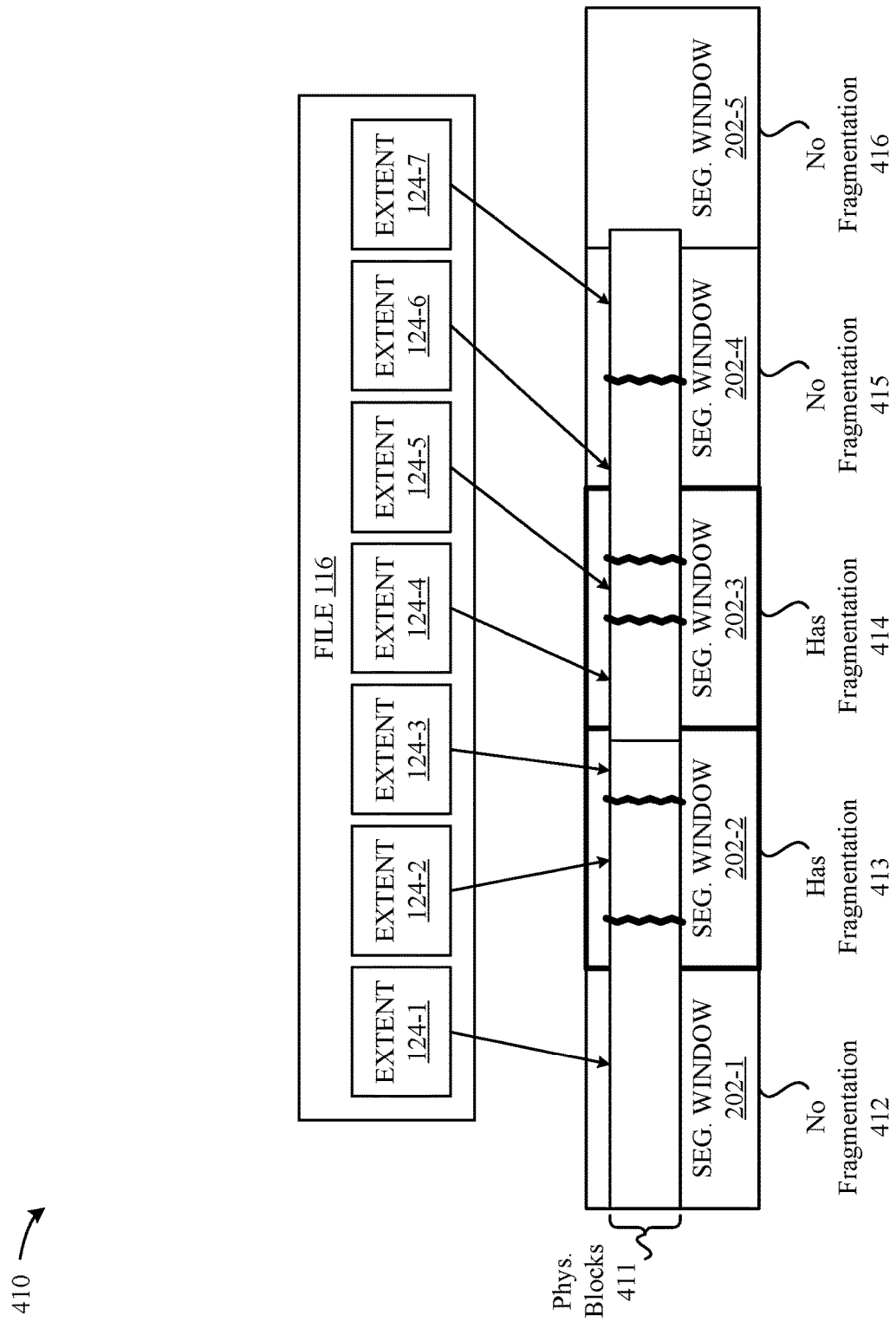
FIGS. 4A-4D illustrate conceptual diagrams of an example scenario in which an example file (marked for defragmentation) undergoes a defragmentation procedure, according to some embodiments.

FIGS. 4A-4D illustrate conceptual diagrams of an example scenario in which the file system manager 110 causes a file 116 (previously marked for defragmentation via a fragmentation analysis) to undergo a defragmentation procedure, according to some embodiments. As shown in FIG. 4A, the example scenario involves the same file 116 described above in conjunction with FIGS. 2A-2E, where an entry that corresponds to the file 116 is included in the fragmentation table 111. Accordingly, a first step 410 of the defragmentation procedure can optionally involve re-scanning the file 116 for any additional fragmentation that might have occurred since the last fragmentation analysis was performed. This can involve, for example, repeating the same steps described above in conjunction with FIGS. 2A-2E to identify different segment windows 202 whose underlying extents 124 are fragmented at a level that satisfies the fragmentation threshold. For the purpose of simplifying this disclosure, it will be understood that the file 116 has not been modified since the fragmentation analysis was performed in conjunction with the steps of FIGS. 2A-2E.

Figure 4B:
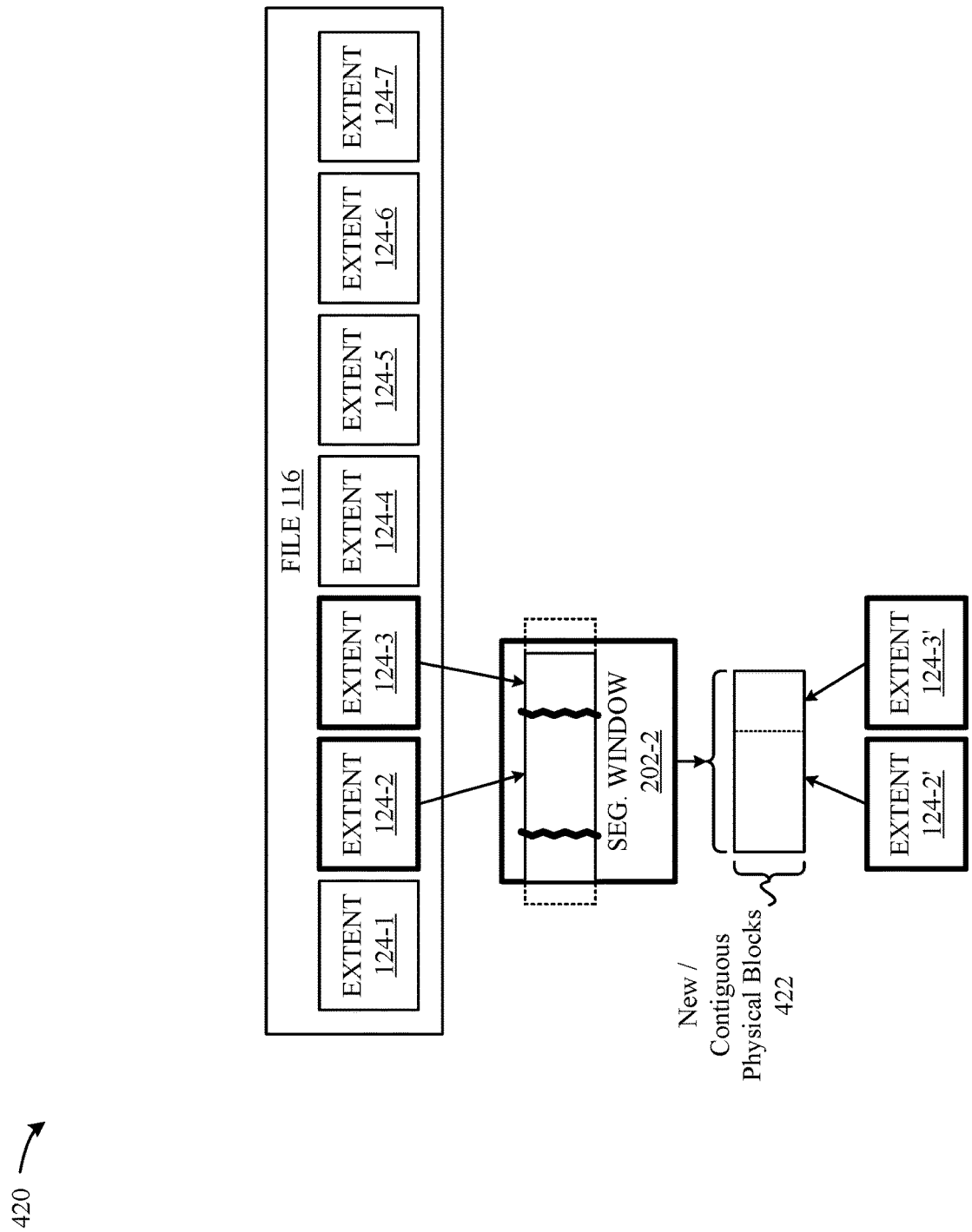
Figure 4C:
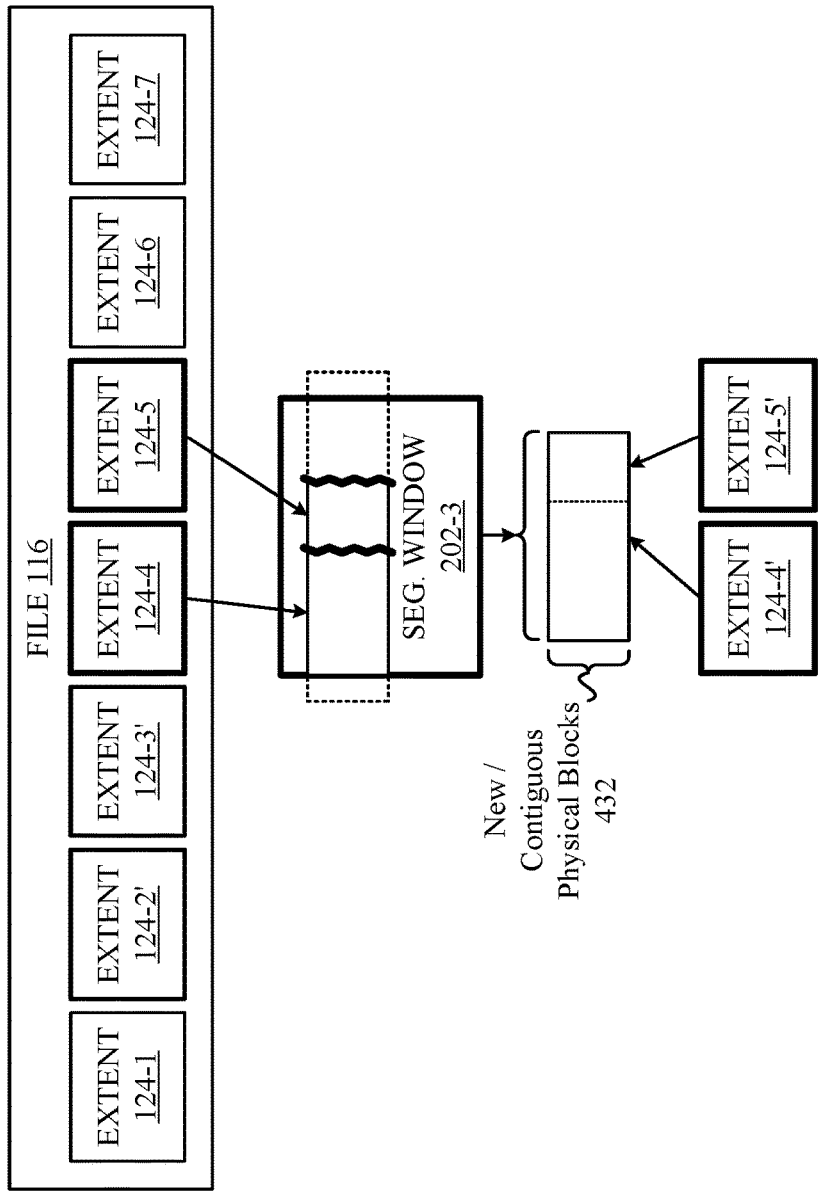
Figure 4D:
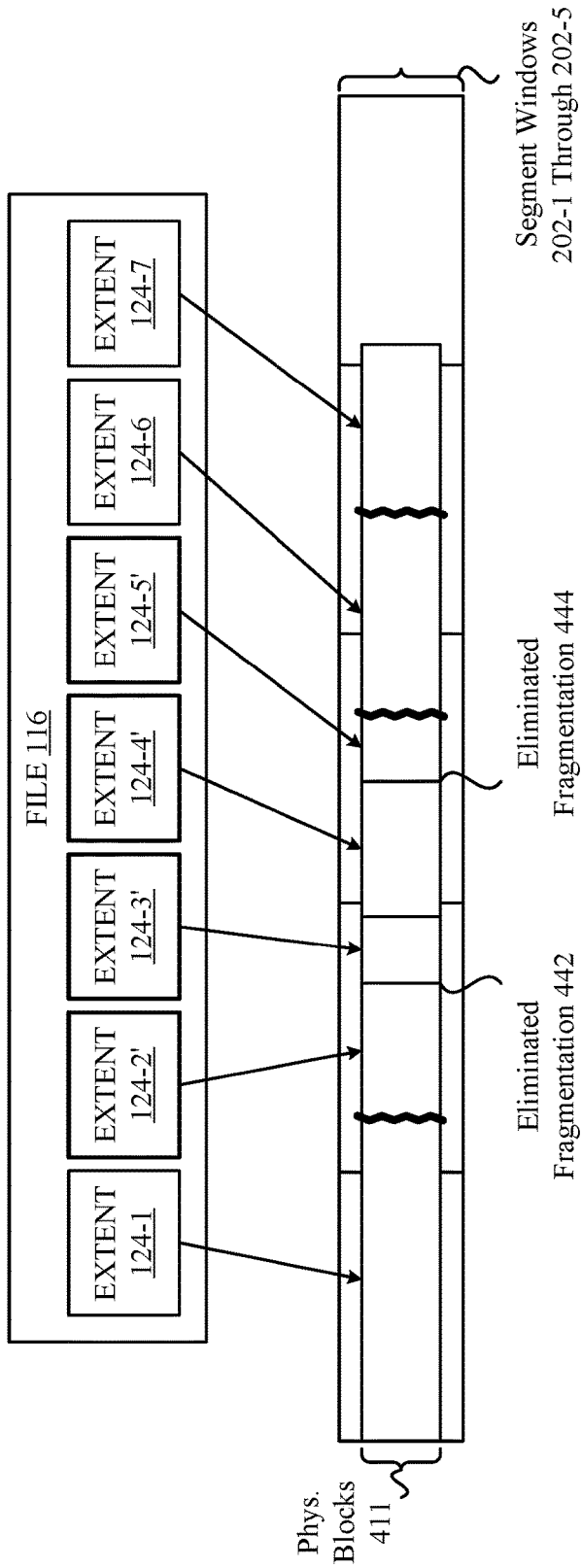

As shown in FIG. 4A, the file system manager 110 can identify that the segment windows 202-2 and 202-3 satisfy (e.g., exceed) the fragmentation threshold (e.g., as addressed by the fragmentation indicators 412-416). Again, this information can be determined using any viable approach, e.g., collecting information during the re-scan of the file 116, collecting information stored in the fragmentation table 111, and so on. In any case, at step 420 in FIG. 4B, the file system manager 110 can address the fragmentation within the segment window 202-2, where the extents 124-2 and 124-3 correspond to the scope of the segment window 202-2 (e.g., as described above in conjunction with FIG. 2B). Next, and as shown in FIG. 4B, the file system manager 110 can be configured to allocate (e.g., within the storage 112) new contiguous physical blocks 422 in accordance with the number of physical blocks 128 associated with the extents 124-2 and 124-3. For example, the file system manager 110 can identify that (1) the extent 124-2 is associated with two thousand physical blocks, and (2) the extent 124-3 is associated with one thousand physical blocks. In turn, the file system manager 110 can allocate three thousand new contiguous physical blocks 422 within the storage 112 to accommodate the data that corresponds to the extents 124-2 and 124-3.

Next, the file system manager 110 can copy the data of the extents 124-2 and 124-3 into the new contiguous physical blocks 422, such that the ending physical block of the extent 124-2 is aligned with (i.e., contiguous to) the starting block of the extent 124-3, and the contiguity gap is eliminated. In turn, the file system manager 110 can update the extents 124-2 and 124-3 to refer to the new contiguous physical blocks 422. This can involve, for example, updating the physical block offset 126/number of physical blocks 128 for each of the extents 124-2 and 124-3 in accordance with the manner in which the copied data is stored within the new contiguous physical blocks 422. Accordingly, at the conclusion of step 420, one of the two contiguity gaps is resolved within the scope of the segment window 202-2, thereby placing the segment window 202-2 at an acceptable fragmentation level (e.g., in accordance with the fragmentation thresholds described herein).

Additionally, as noted above, the segment window 202-3 should also undergo a defragmentation procedure, as two contiguity gaps exist within the scope of the segment window 202-3. Accordingly, as previously described above, the file system manager 110 can be configured to allocate new contiguous physical blocks 432 in accordance with the number of physical blocks 128 belonging to the extents 124-4 and 124-5. For example, the file system manager 110 can identify that (1) the extent 124-4 is associated with one thousand physical blocks, and (2) the extent 124-5 is associated with three thousand physical blocks. In turn, the file system manager 110 can allocate four thousand new contiguous physical blocks 432 within the storage 112 to accommodate the data that corresponds to the extents 124-4 and 124-5.

Next, the file system manager 110 can copy the data of the extents 124-4 and 124-5 into the new contiguous physical blocks 432, such that the ending physical block of the extent 124-4 is aligned with the starting block of the extent 124-5 (thereby eliminating the previous contiguity gap). In turn, the file system manager 110 can update the extents 124-4 and 124-5 to refer to the new contiguous physical blocks 432. This can involve, for example, updating the physical block offset 126/number of physical blocks 128 for each of the extents 124-4 and 124-5 in accordance with the manner in which the copied data is stored within the new contiguous physical blocks 432. Accordingly, at the conclusion of step 430, one of the two contiguity gaps is resolved within the scope of the segment window 202-3, thereby placing the segment window 202-3 at an acceptable fragmentation level.

Accordingly, at the conclusion of steps 420-430, the overall fragmentation of the extents 124 that correspond to the segment windows 202-2 and 203-3 has been lowered to an acceptable level of fragmentation. This notion is captured at step 440 of FIG. 4D, which illustrates a new layout of the extents 124 of the file 116. For example, two different contiguity gaps have been eliminated from the file 116, as indicated by the eliminated fragmentation 442 and the eliminated fragmentation 444 elements in FIG. 4D. In this manner, the efficiency by which the file 116 can be subsequently accessed is increased, as eliminating the contiguity gaps can improve seek latency and reduce the power/mechanical resources required to access the underlying physical blocks that store the data of the file 116.

Additionally, it is noted that the defragmentation procedures described above in conjunction with FIGS. 4A-4D are merely exemplary, and that additional approaches can be utilized with respect to how the extents 124 within each segment window 202 are defragmented. For example, in FIG. 4A, the overlapping portion of the extent 124-1 that bleeds across the boundary of the segment windows 202-1/202-2 can be targeted by the defragmentation procedure. In particular, the extent 124-1 can be divided into two split extents 124, where the first split extent 124 ends at the ending boundary of the segment window 202-1, and the second split extent 124 starts at the starting boundary of the segment window 202-2. In this regard, the second split extent 124 will be included with the extents 124-2 and 124-3 that are copied into the new contiguous physical blocks 422 (described above in conjunction with FIG. 4B). In turn, the same foregoing extent 124 splitting techniques can be applied to the additional extents 124 that overlap boundaries of the different segment windows 202 illustrated in FIGS. 4A-4D. In this manner, absolute physical block contiguity can be achieved within the scope of each segment window 202.

Accordingly, FIGS. 4A-4D provide a detailed breakdown of an example scenario in which the file 116 can undergo a defragmentation procedure. A high-level breakdown of these various techniques will now be discussed below in conjunction with FIG. 5, with reference to FIGS. 4A-4D.

Figure 5:
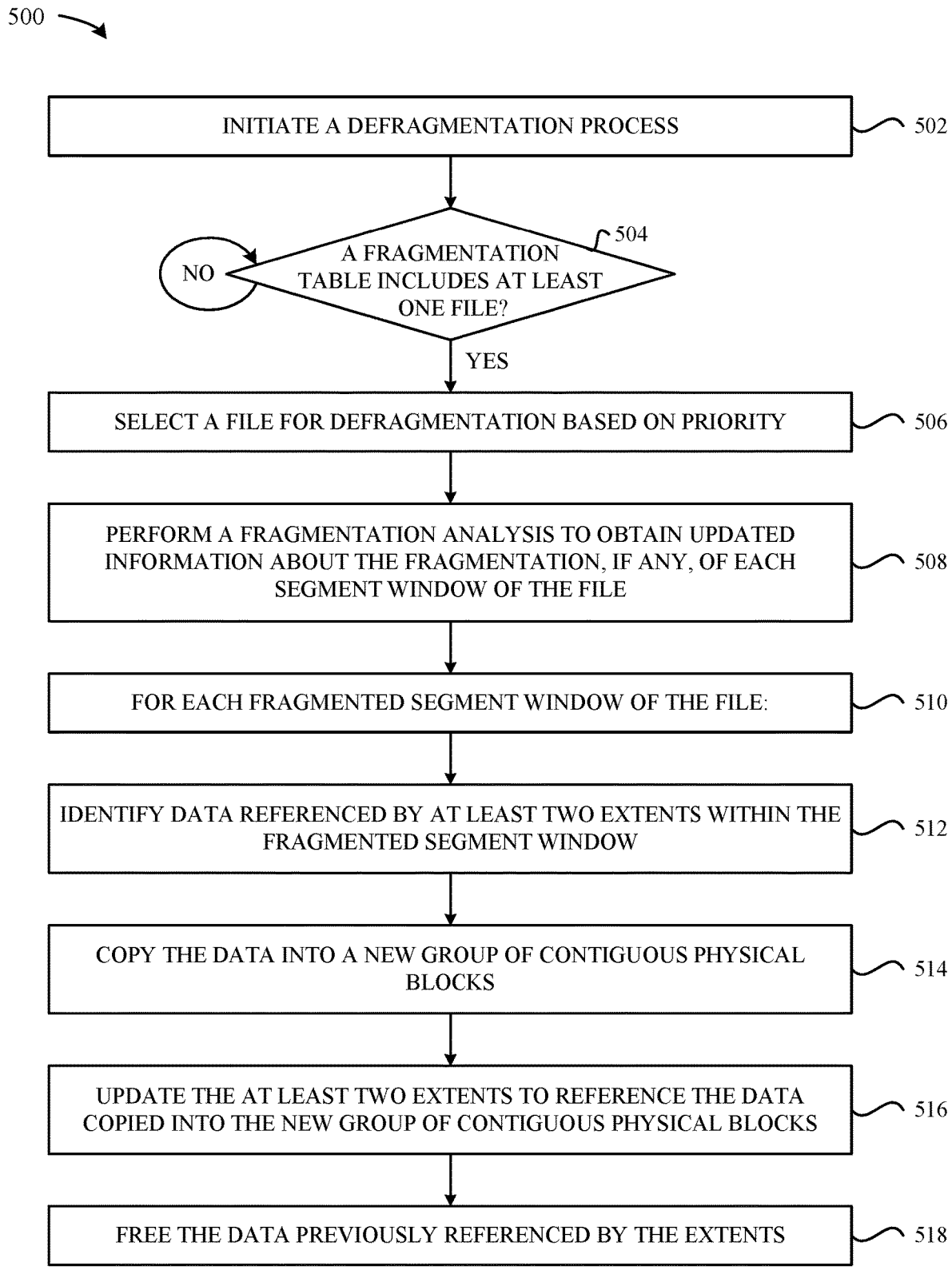
FIG. 5 illustrates a method for defragmenting a file, according to some embodiments.

FIG. 5 illustrates a method 500 for defragmenting a file 116 at the computing device 102, according to some embodiments. As shown in FIG. 5, the method 500 begins at step 502, where the file system manager 110 initiates a defragmentation process. As previously described above, this can involve, for example, the file system manager 110 identifying that it is a convenient time to defragment files 116 (e.g., the computing device 102 is idle and plugged-in), identifying that a number of entries within the fragmentation table 111 satisfies a threshold (e.g., the fragmentation table 111 is almost full), and so on. In any case, at step 504, the file system manager 110 determines whether the fragmentation table 111 includes at least one file 116. If, at step 504, the file system manager 110 determines that the fragmentation table 111 includes at least one file 116, then the method 500 proceeds to step 506. Otherwise, the method 500 can end or sit idle at step 504, where the file system manager 110 waits to identify files 116 for defragmentation.

At step 506, the file system manager 110 selects (from the fragmentation table 111) a file 116 for defragmentation, e.g., based on a priority indicated in the fragmentation table 111. For example, the file system manager 110 can select the file 116 having the highest fragmentation score 122. Again, it is noted that the examples described herein do not represent an exhaustive list of the different ways the file system manager 110 can manage the order in which the files 116 are defragmented. On the contrary, any number of conditions/parameters can be taken into consideration. For example, the file system manager 110 can identify a file 116 within the fragmentation table 111 that is most-frequently accessed by a user, and prioritize the file 116 for defragmentation even when the overall fragmentation level of the file 116 is less than other files 116 referenced in the fragmentation table 111. In any case, at step 508, the file system manager 110 performs a fragmentation analysis—e.g., the re-scan described above in conjunction with FIG. 4A—to obtain updated information about the fragmentation, if any, of the file 116 on a segment window 202 basis.

Next, at step 510, the file system manager 110 carries out steps 512-518 for each fragmented segment window 202 of the file 116. In particular, at step 512, the file system manager 110 identifies data referenced by at least two extents 124 within the fragmented segment window 202 (e.g., as described above in conjunction with FIGS. 4B-4C). At step 514, the file system manager 110 copies the data into a new group of contiguous physical blocks (e.g., as described above in conjunction with FIGS. 4B-4C). At step 516, the file system manager 110 updates the at least two extents 124 to reference the data copied into the new group of contiguous physical blocks (e.g., as described above in conjunction with FIGS. 4B-4C). Finally, at step 518, the file system manager 110 frees the data previously referenced by the extents (e.g., as described above in conjunction with FIGS. 4B-4C). In this manner, the fragmentation levels of the segment windows 202 can be reduced to an acceptable level, thereby improving the overall performance of the computing device 102 (e.g., as described above in conjunction with FIG. 4D).

Figure 6:
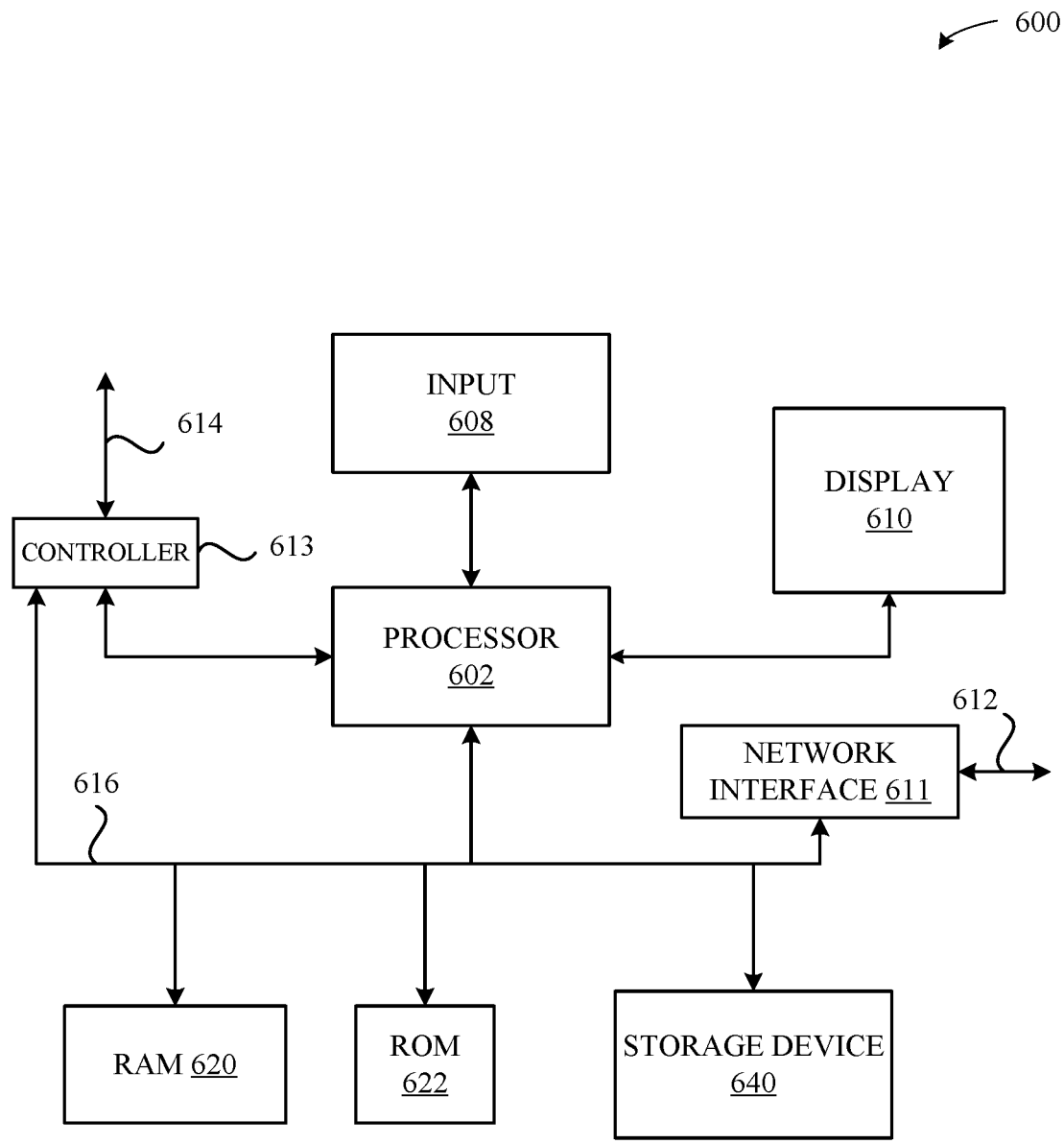
FIG. 6 illustrates a detailed view of components that can be included in the computing device illustrated in FIG. 1, according to some embodiments.

FIG. 6 illustrates a detailed view of a computing device 600 that can be used to implement the various techniques described herein, according to some embodiments. In particular, the detailed view illustrates various components that can be included in the computing device 102 described in conjunction with FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 (e.g., via a graphics component) to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also includes the storage device 640, which can comprise a single disk or a collection of disks (e.g., hard drives). In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 600, e.g., the file system manager 110.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing fragmentation of files at a computing device, the method comprising, at the computing device:
   receiving a request to access a file, wherein the file is associated with (i) a scanned flag, and (ii) a fragmentation score;
   determining, based on the scanned flag, that the file should be scanned for fragmentation; and
   in response to determining that the file should be scanned for fragmentation:
      accessing a plurality of extents associated with the file, wherein each extent of the plurality of extents corresponds to (i) a starting physical block address within a memory, and (ii) a length of successive physical blocks within the memory;
      establishing, based on a size of the file, a plurality of segment windows under which to analyze the plurality of extents;
      for each segment window of the plurality of segment windows in which at least two extents of the plurality of extents are logically disposed:
         identifying, among the at least two extents, a number of contiguity gaps that exist between the respective physical blocks of the at least two extents, and
         adding the number to the fragmentation score when the number satisfies a fragmentation threshold; and
      updating the scanned flag to indicate that the file should not be scanned for fragmentation.

2. The method of claim 1, further comprising:
   performing a defragmentation procedure that comprises:
      identifying that the fragmentation score of the file indicates that the file should be defragmented; and
      for each segment window having a number contiguity gaps that satisfies the fragmentation threshold:
         copying, into a new group of contiguous physical blocks within the memory, data referenced by the extents that correspond to the contiguity gaps,
         updating the extents to reference the data copied into the new group of contiguous physical blocks, and
         freeing the data previously referenced by the extents.

3. The method of claim 1, wherein the request to access the file comprises a read request, a write request, or a memory map request.

4. The method of claim 1, further comprising:
   receiving a notification that at least one extent is being removed from the file; and
   in response to determining that (1) the scanned flag indicates that the file should not be scanned for fragmentation, and (2) the fragmentation score indicates that fragmentation exists in the file:
      updating the scanned flag to indicate that the file should be scanned for fragmentation.

5. The method of claim 1, further comprising:
   receiving a notification that at least one extent is being added to the file; and
   in response to determining that the scanned flag indicates that the file should not be scanned for fragmentation:
      updating the scanned flag to indicate that the file should be scanned for fragmentation.

6. The method of claim 1, wherein any extents that are stored on a storage device that is included in a pre-defined list of storage devices are ignored.

7. The method of claim 1, wherein, when any of the at least two extents that are logically disposed within a segment window of the plurality of segment windows correspond to allocated but unused storage space, the extents are ignored with respect to identifying the number of contiguity gaps.

8. At least one non-transitory computer readable storage medium configured to store instructions that, when executed by a processor included in a computing device, cause the computing device to manage fragmentation of files at the computing device, by carrying out steps that include:
   receiving a request to access a file, wherein the file is associated with (i) a scanned flag, and (ii) a fragmentation score;
   determining, based on the scanned flag, that the file should be scanned for fragmentation; and
   in response to determining that the file should be scanned for fragmentation:
      accessing a plurality of extents associated with the file, wherein each extent of the plurality of extents corresponds to (i) a starting physical block address within a memory, and (ii) a length of successive physical blocks within the memory;
      establishing, based on a size of the file, a plurality of segment windows under which to analyze the plurality of extents;
      for each segment window of the plurality of segment windows in which at least two extents of the plurality of extents are logically disposed:
         identifying, among the at least two extents, a number of contiguity gaps that exist between the respective physical blocks of the at least two extents, and
         adding the number to the fragmentation score when the number satisfies a fragmentation threshold; and
      updating the scanned flag to indicate that the file should not be scanned for fragmentation.

9. The at least one non-transitory computer readable storage medium of claim 8, wherein the steps further include performing a defragmentation procedure that comprises:
   identifying that the fragmentation score of the file indicates that the file should be defragmented; and
   for each segment window having a number contiguity gaps that satisfies the fragmentation threshold:
      copying, into a new group of contiguous physical blocks within the memory, data referenced by the extents that correspond to the contiguity gaps,
      updating the extents to reference the copied data in the new group of contiguous physical blocks, and
      freeing the data previously referenced by the extents.

10. The at least one non-transitory computer readable storage medium of claim 8, wherein the request to access the file comprises a read request, a write request, or a memory map request.

11. The at least one non-transitory computer readable storage medium of claim 8, wherein the steps further include:
   receiving a notification that at least one extent is being removed from the file; and
   in response to determining that (1) the scanned flag indicates that the file should not be scanned for fragmentation, and (2) the fragmentation score indicates that fragmentation exists in the file:
      updating the scanned flag to indicate that the file should be scanned for fragmentation.

12. The at least one non-transitory computer readable storage medium of claim 8, wherein the steps further include:
   receiving a notification that at least one extent is being added to the file; and
   in response to determining that the scanned flag indicates that the file should not be scanned for fragmentation:
      updating the scanned flag to indicate that the file should be scanned for fragmentation.

13. The at least one non-transitory computer readable storage medium of claim 8, wherein any extents that are stored on a storage device that is included in a pre-defined list of storage devices are ignored.

14. The at least one non-transitory computer readable storage medium of claim 8, wherein, when any of the at least two extents that are logically disposed within a segment window of the plurality of segment windows correspond to allocated but unused storage space, the extents are ignored with respect to identifying the number of contiguity gaps.

15. A computing device configured to manage fragmentation of files, the computing device comprising:
   at least one processor; and
   at least one memory configured to store instructions that, when executed by the at least one processor, cause the computing device to:
      receive a request to access a file, wherein the file is associated with (i) a scanned flag, and (ii) a fragmentation score;
      determine, based on the scanned flag, that the file should be scanned for fragmentation; and
      in response to determining that the file should be scanned for fragmentation:
         access a plurality of extents associated with the file, wherein each extent of the plurality of extents corresponds to (i) a starting physical block address within a memory, and (ii) a length of successive physical blocks within the memory;
         establish, based on a size of the file, a plurality of segment windows under which to analyze the plurality of extents;
         for each segment window of the plurality of segment windows in which at least two extents of the plurality of extents are logically disposed:
            identify, among the at least two extents, a number of contiguity gaps that exist between the respective physical blocks of the at least two extents, and
            add the number to the fragmentation score when the number satisfies a fragmentation threshold; and
         update the scanned flag to indicate that the file should not be scanned for fragmentation.

16. The computing device of claim 15, wherein the at least one processor further causes the computing device to perform a defragmentation procedure, and the defragmentation procedure causes the computing device to:
   identify that the fragmentation score of the file indicates that the file should be defragmented; and
   for each segment window having a number contiguity gaps that satisfies the fragmentation threshold:
      copy, into a new group of contiguous physical blocks within the memory, data referenced by the extents that correspond to the contiguity gaps,
      update the extents to reference the copied data in the new group of contiguous physical blocks, and
      free the data previously referenced by the extents.

17. The computing device of claim 15, wherein the request to access the file comprises a read request, a write request, or a memory map request.

18. The computing device of claim 15, wherein the at least one processor further causes the computing device to:
   receive a notification that at least one extent is being removed from the file; and
   in response to determining that (1) the scanned flag indicates that the file should not be scanned for fragmentation, and (2) the fragmentation score indicates that fragmentation exists in the file:
      update the scanned flag to indicate that the file should be scanned for fragmentation.

19. The computing device of claim 15, wherein the at least one processor further causes the computing device to:
   receive a notification that at least one extent is being added to the file; and
   in response to determining that the scanned flag indicates that the file should not be scanned for fragmentation:
      update the scanned flag to indicate that the file has should be scanned for fragmentation.

20. The computing device of claim 15, wherein any extents that are stored on a storage device that is included in a pre-defined list of storage devices are ignored.

* * * * *

UNITED STATES PATENT AND TRADEMARK OFFICE
CERTIFICATE OF CORRECTION

| | |
|---|---|
| PATENT NO. | : 10,599,619 B2 |
| APPLICATION NO. | : 15/721416 |
| DATED | : March 24, 2020 |
| INVENTOR(S) | : Stouder-Studenmund et al. |

It is certified that error appears in the above-identified patent and that said Letters Patent is hereby corrected as shown below:

In the Claims

In Claim 19, at Column 18, Line 39-40: "update the scanned flag to indicate that the file has should be scanned for fragmentation." should read -- update the scanned flag to indicate that the file should be scanned for fragmentation. --.

Signed and Sealed this
Eighth Day of March, 2022

Drew Hirshfeld
*Performing the Functions and Duties of the
Under Secretary of Commerce for Intellectual Property and
Director of the United States Patent and Trademark Office*